United States Patent
Karampatsis et al.

(10) Patent No.: US 11,425,263 B2
(45) Date of Patent: Aug. 23, 2022

(54) VALIDITY INFORMATION CONDITIONS FOR A PROTOCOL DATA UNIT SESSION FOR BACKGROUND DATA TRANSFER

(71) Applicant: Lenovo (Singapore) PTE. LTD., New Tech Park (SG)

(72) Inventors: Dimitrios Karampatsis, Ruislip (GB); Genadi Velev, Darmstadt (DE)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/866,148

(22) Filed: May 4, 2020

(65) Prior Publication Data
US 2020/0351409 A1 Nov. 5, 2020

Related U.S. Application Data
(60) Provisional application No. 62/842,764, filed on May 3, 2019.

(51) Int. Cl.
| | | |
|---|---|---|
| *G06F 15/16* | (2006.01) | |
| *H04M 15/00* | (2006.01) | |
| *H04L 12/14* | (2006.01) | |
| *H04L 67/14* | (2022.01) | |
| *H04W 80/10* | (2009.01) | |
| *H04W 12/63* | (2021.01) | |

(52) U.S. Cl.
CPC ........ *H04M 15/66* (2013.01); *H04L 12/1407* (2013.01); *H04L 67/14* (2013.01); *H04W 12/63* (2021.01); *H04W 80/10* (2013.01)

(58) Field of Classification Search
CPC .... H04L 12/1407; H04L 67/14; H04W 80/10; H04M 15/66
See application file for complete search history.

(56) References Cited

U.S. PATENT DOCUMENTS

| | | | |
|---|---|---|---|
| 2004/0107235 A1* | 6/2004 | Koskelainen | H04L 65/1043 709/200 |
| 2005/0010665 A1* | 1/2005 | Kuno | H04M 7/006 709/224 |
| 2006/0045080 A1* | 3/2006 | Islam | H04W 80/04 370/389 |
| 2006/0168220 A1* | 7/2006 | Katoh | H04L 63/08 709/225 |

(Continued)

OTHER PUBLICATIONS

Kddi, et al., Adding Support for Delivering Background Data Transfer Polices to the UE, 3GPP TSG-SA2 Meeting #132 S2-1904376, Apr. 8-12, 2019, pp. 1-5.

(Continued)

*Primary Examiner* — Razu A Miah
(74) *Attorney, Agent, or Firm* — Kunzler Bean & Adamson

(57) ABSTRACT

Apparatuses, methods, and systems are disclosed for using validity information conditions for a protocol data unit session for background data transfer. One method for using validity information conditions for a protocol data unit session for background data transfer includes a device determining validity information for the protocol data unit session for the background data transfer. The device initiates release of the protocol data unit session if a condition of the validity information is not satisfied.

14 Claims, 8 Drawing Sheets

(56) References Cited

U.S. PATENT DOCUMENTS

| | | | | |
|---|---|---|---|---|
| 2007/0143483 | A1* | 6/2007 | Lim | H04L 67/14 709/227 |
| 2007/0153769 | A1* | 7/2007 | Comstock | H04L 29/12801 370/352 |
| 2010/0284327 | A1* | 11/2010 | Miklos | H04W 8/082 370/328 |
| 2012/0042085 | A1* | 2/2012 | Boeszoermenyi | H04L 65/80 709/228 |
| 2012/0044930 | A1* | 2/2012 | Ajero | H04L 12/2801 370/352 |
| 2012/0110056 | A1* | 5/2012 | Van Biljon | H04L 63/102 709/201 |
| 2012/0117201 | A1* | 5/2012 | Arolovitch | H04L 67/16 709/219 |
| 2012/0124222 | A1* | 5/2012 | Noldus | H04L 65/1069 709/227 |
| 2012/0246325 | A1* | 9/2012 | Pancorbo Marcos | H04L 63/102 709/227 |
| 2012/0265888 | A1* | 10/2012 | Roeland | H04L 12/1403 709/228 |
| 2012/0314632 | A1* | 12/2012 | Martinez De La Cruz | H04L 65/80 370/310 |
| 2014/0189137 | A1* | 7/2014 | Castro Castro | H04L 43/028 709/228 |
| 2015/0087262 | A1* | 3/2015 | Wu | H04M 15/8038 455/408 |
| 2015/0133151 | A1* | 5/2015 | Jung | H04W 64/00 455/456.1 |
| 2015/0257182 | A1* | 9/2015 | Li | H04W 48/18 370/329 |
| 2015/0304937 | A1* | 10/2015 | Kim | H04W 80/10 370/230 |
| 2015/0373167 | A1* | 12/2015 | Murashov | H04L 69/321 370/392 |
| 2017/0235940 | A1* | 8/2017 | McEwen | G06F 9/50 726/19 |
| 2018/0192390 | A1* | 7/2018 | Li | H04W 16/04 |
| 2018/0192471 | A1* | 7/2018 | Li | H04W 8/065 |
| 2018/0199240 | A1* | 7/2018 | Dao | H04W 76/10 |
| 2018/0270715 | A1* | 9/2018 | Lee | H04W 36/0022 |
| 2018/0352483 | A1* | 12/2018 | Youn | H04W 76/18 |
| 2018/0376444 | A1* | 12/2018 | Kim | H04W 4/70 |
| 2018/0376445 | A1* | 12/2018 | Yoon | H04W 76/30 |
| 2019/0007500 | A1* | 1/2019 | Kim | H04L 67/141 |
| 2019/0007992 | A1* | 1/2019 | Kim | H04W 64/006 |
| 2019/0098537 | A1* | 3/2019 | Qiao | H04W 36/0033 |
| 2019/0124671 | A1* | 4/2019 | Starsinic | H04W 4/60 |

OTHER PUBLICATIONS

Nokia, et al, Providing Background Data Transfer Policies to a UE, 3GPP TSG-SA Meeting #132 S2-1903324, Apr. 8-12, 2019, pp. 1-9.

3GPP, 3rd Generation Partnership Project; Technical Specification Group Services and System Aspects; Policy and Charging Control Framework for the 5G System; Stage 2 (Release 16), 3GPP TS 23.503 V16.0.0, Mar. 2019, pp. 1-84.

3GPP, 3rd Generation Partnership Project; Technical Specification Group Services and System Aspects; Procedures for the 5G System; Stage 2 (Release 16), 3GPP TS 23.502 V16.0.2, Apr. 2019, pp. 1-419.

"Notification of transmittal of the international search report and the written opinion of the international searching authority or the declaration", ISA, dated Aug. 4, 2020, pp. 1-12.

3GPP, "3rd Generation Partnership Project; Technical Specification Group Services and System Aspects; System Architecture for the 5G System; Stage 2 (Release 16)", 3GPP TS 23.501 V16.0.2, Apr. 2019, pp. 1-317.

3GPP, "3rd Generation Partnership Project; Technical Specification Group Core Network and Terminals; User Equipment (UE) policies for 5G System (5GS); Stage 3 (Release 15)", 3GPP TS 24.526 V15.2.0, Mar. 2019, pp. 1-40.

* cited by examiner

VALIDITY INFORMATION CONDITIONS FOR A PROTOCOL DATA UNIT SESSION FOR BACKGROUND DATA TRANSFER

CROSS-REFERENCE TO RELATED APPLICATIONS

This application claims priority to U.S. Patent Application Ser. No. 62/842,764 entitled "APPARATUSES, METHODS, AND SYSTEMS FOR ENFORCING VALIDITY CONDITIONS TO A DATA CONNECTION" and filed on May 3, 2019 for Dimitrios Karampatsis, which is incorporated herein by reference in its entirety.

FIELD

The subject matter disclosed herein relates generally to wireless communications and more particularly relates to validity information conditions.

BACKGROUND

The following abbreviations are herewith defined, at least some of which are referred to within the following description: Third Generation Partnership Project ("3GPP"), $5^{th}$ Generation ("5G"), QoS for NR V2X Communication ("5QI/PQI"), Authentication, Authorization, and Accounting ("AAA"), Positive-Acknowledgment ("ACK"), Application Function ("AF"), Authentication and Key Agreement ("AKA"), Aggregation Level ("AL"), Access and Mobility Management Function ("AMF"), Angle of Arrival ("AoA"), Angle of Departure ("AoD"), Access Point ("AP"), Access Stratum ("AS"), Application Service Provider ("ASP"), Autonomous Uplink ("AUL"), Authentication Server Function ("AUSF"), Authentication Token ("AUTN"), Background Data ("BD"), Background Data Transfer ("BDT"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Channel Access Priority Class ("CAPC"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Configured Grant ("CG"), Closed-Loop ("CL"), Coordinated Multipoint ("CoMP"), Channel Occupancy Time ("COT"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink Feedback Information ("DFI"), Downlink ("DL"), Demodulation Reference Signal ("DMRS"), Data Network Name ("DNN"), Data Radio Bearer ("DRB"), Discontinuous Reception ("DRX"), Dedicated Short-Range Communications ("DSRC"), Downlink Pilot Time Slot ("DwPTS"), Enhanced Clear Channel Assessment ("eCCA"), Enhanced Mobile Broadband ("eMBB"), Evolved Node B ("eNB"), Extensible Authentication Protocol ("EAP"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1-sub 6 GHz frequency bands and/or 410 MHz to 7125 MHz ("FR1"), Frequency Range 2-24.25 GHz to 52.6 GHz ("FR2"), Universal Geographical Area Description ("GAD"), Guaranteed Bit Rate ("GBR"), Group Leader ("GL"), 5G Node B or Next Generation Node B ("gNB"), Global Navigation Satellite System ("GNSS"), General Packet Radio Services ("GPRS"), Guard Period ("GP"), Global Positioning System ("GPS"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Hash Expected Response ("HXRES"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Layer 1 ("L1"), Layer 2 ("L2"), Layer 3 ("L3"), Licensed Assisted Access ("LAA"), Local Area Data Network ("LADN"), Local Area Network ("LAN"), Load Based Equipment ("LBE"), Listen-Before-Talk ("LBT"), Logical Channel ("LCH"), Logical Channel Group ("LCG"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Maximum Bit Rate ("MBR"), Minimum Communication Range ("MCR"), Modulation Coding Scheme ("MCS"), Master Information Block ("MIB"), Multiple Input Multiple Output ("MIMO"), Mobility Management ("MM"), Mobility Management Entity ("MME"), Mobile Network Operator ("MNO"), Mobile Originated ("MO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), New Data Indicator ("NDP"), Network Entity ("NE"), Network Function ("NF"), Next Generation ("NG"), NG 5G S-TMSI ("NG-5G-S-TMSI"), Non-Orthogonal Multiple Access ("NOMA"), New Radio ("NR"), NR Unlicensed ("NR-U"), Network Repository Function ("NRF"), Network Scheduled Mode ("NS Mode") (e.g., network scheduled mode of V2X communication resource allocation—Mode-1 in NR V2X and Mode-3 in LTE V2X), Network Slice Instance ("NSI"), Network Slice Selection Assistance Information ("NSSAI"), Network Slice Selection Function ("NSSF"), Network Slice Selection Policy ("NSSP"), Operation, Administration, and Maintenance System or Operation and Maintenance Center ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), UE to UE interface ("PC5"), Policy and Charging Control ("PCC"), Primary Cell ("PCell"), Policy Control Function ("PCF"), Physical Cell Identity ("PCP"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), PC5 QoS Class Identifier ("PQI"), Physical Random Access Channel ("PRACH"), Physical Resource Block ("PRB"), Positioning Reference Signal ("PRS"), Physical Sidelink Control Channel ("PSCCH"), Primary Secondary Cell ("PSCell"), Physical Sidelink Feedback Control Channel ("PSFCH"), Physical Uplink Control Channel ("PUCCH"), Physical Uplink Shared Channel ("PUSCH"), QoS Class Identifier ("QCI"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Random ("RAND"), Radio Access Technology ("RAT"), Serving RAT ("RAT-1") (serving with respect to Uu), Other RAT ("RAT-2") (non-serving with respect to Uu), Random Access Procedure ("RACH"), Random Access Preamble Identifier ("RAPID"), Random Access Response ("RAR"), Resource Block Assignment ("RBA"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Failure ("RLF"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Received Signal Strength Indicator ("RSSI"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCI"), Sub-carrier Spacing ("SCS"), Service Data Unit ("SDU"), Security Anchor Function ("SEAF"), Sidelink Feedback Content Information ("SFCI"), Serving Gateway ("SGW"), System Information Block ("SIB"), SystemInformationBlockType1 ("SIB1"), SystemInformationBlockType2 ("SIB2"), Sub scriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management ("SM"), Session Management Function ("SMF"), Special Cell ("SpCell"), Single Network Slice Selection Assistance Information ("S-NSSAI"), Scheduling Request ("SR"), Signaling Radio Bearer ("SRB"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink SSB ("S-SSB"), Synchronization Signal Block ("SSB"), Subscription Concealed Identifier ("SUCI"), Scheduling User Equipment ("SUE"), Supplementary Uplink ("SUL"), Subscriber Permanent Identifier ("SUPI"), Tracking Area ("TA"), TA Identifier ("TM"), TA Update ("TAU"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE") (e.g., a V2X UE), UE Autonomous Mode (UE autonomous selection of V2X communication resource—e.g., Mode-2 in NR V2X and Mode-4 in LTE V2X. UE autonomous selection may or may not be based on a resource sensing operation), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Vehicle-to-Anything ("V2X"), V2X UE (e.g., a UE capable of vehicular communication using 3GPP protocols), Visiting AMF ("vAMF"), Visiting NSSF ("vNSSF"), Visiting PLMN ("VPLMN"), Wide Area Network ("WAN"), and Worldwide Interoperability for Microwave Access ("WiMAX").

In certain wireless communications networks, validity information may be used.

BRIEF SUMMARY

Methods for validity information conditions are disclosed. Apparatuses and systems also perform the functions of the methods. One embodiment of a method includes determining validity information for a protocol data unit session for background data transfer. In some embodiments, the method includes initiating release of the protocol data unit session in response to a condition of the validity information not being satisfied.

One apparatus for validity information conditions includes a processor that: determines validity information for a protocol data unit session for background data transfer; and initiates release of the protocol data unit session in response to a condition of the validity information not being satisfied.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
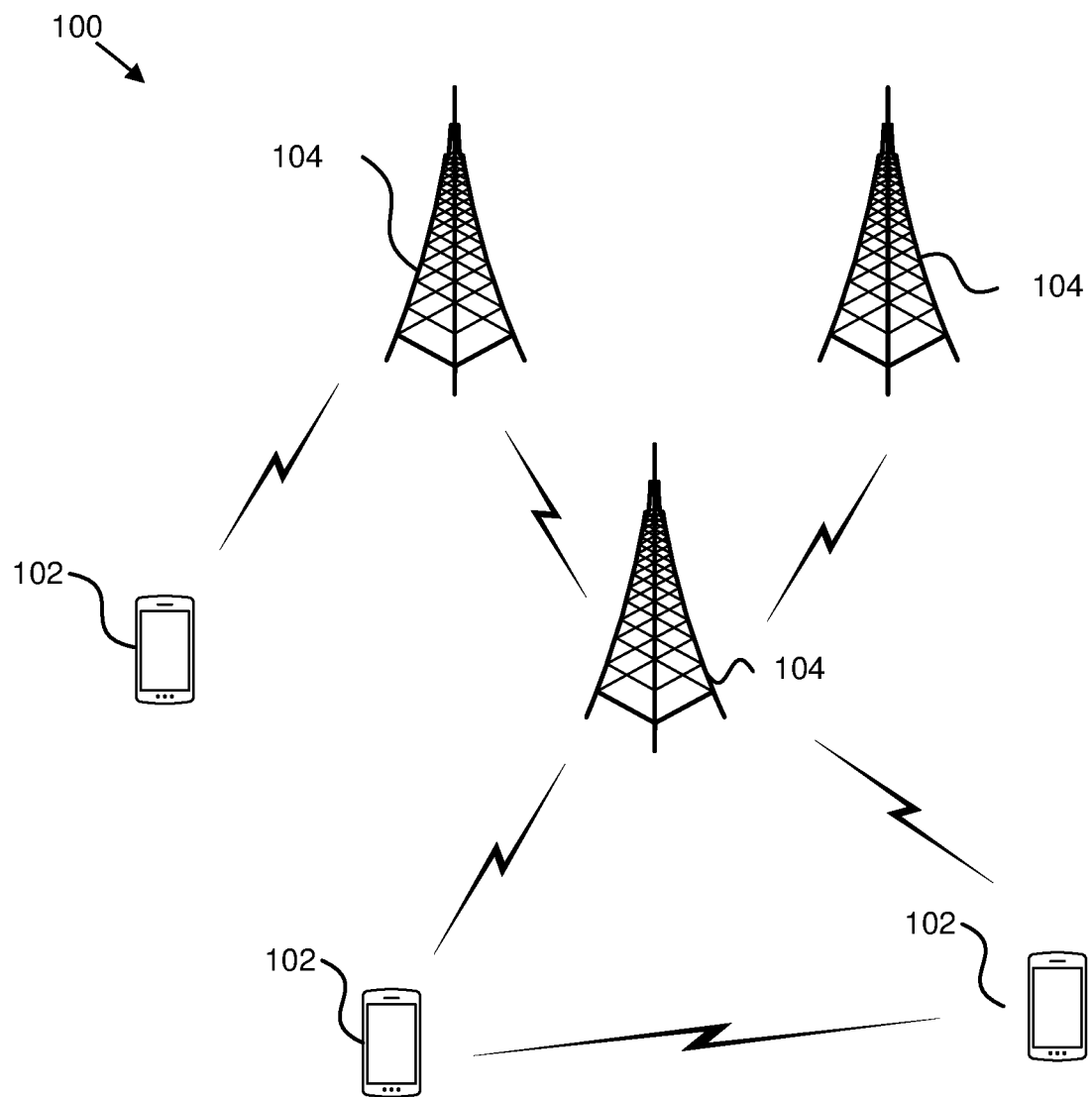
FIG. 1 is a schematic block diagram illustrating one embodiment of a wireless communication system for validity information conditions.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for validity information conditions. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may determine validity information for a protocol data unit session for background data transfer. In some embodiments, the network unit 104 may initiate release of the protocol data unit session in response to a condition of the validity information not being satisfied. Accordingly, the network unit 104 may be used for validity information conditions.

Figure 2:
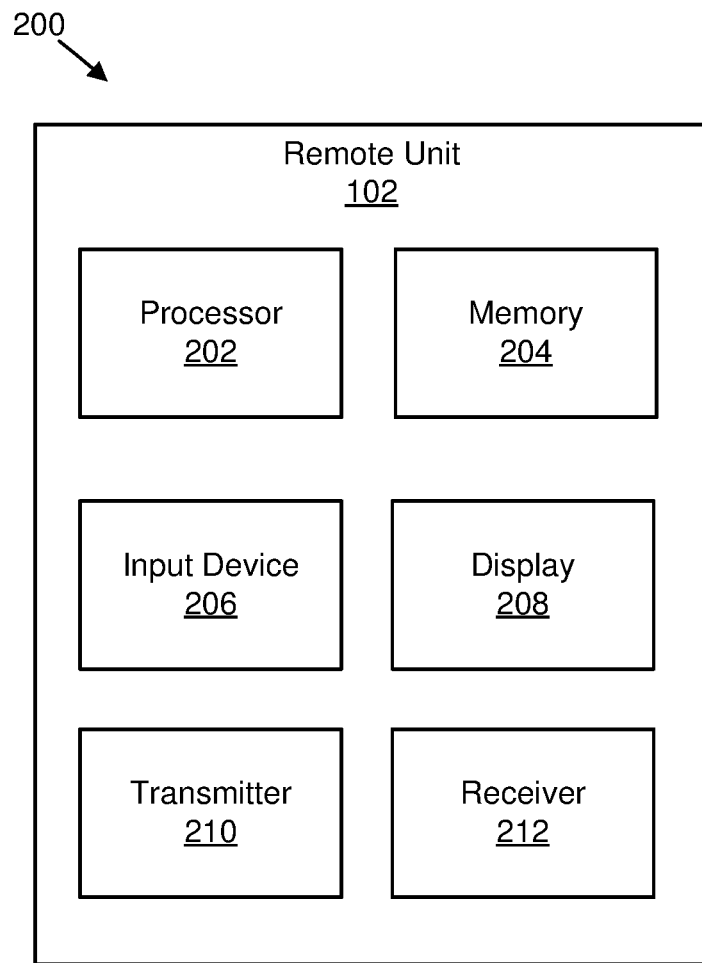
FIG. 2 is a schematic block diagram illustrating one embodiment of an apparatus that may be used for validity information conditions.

FIG. 2 depicts one embodiment of an apparatus 200 that may be used for validity information conditions. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
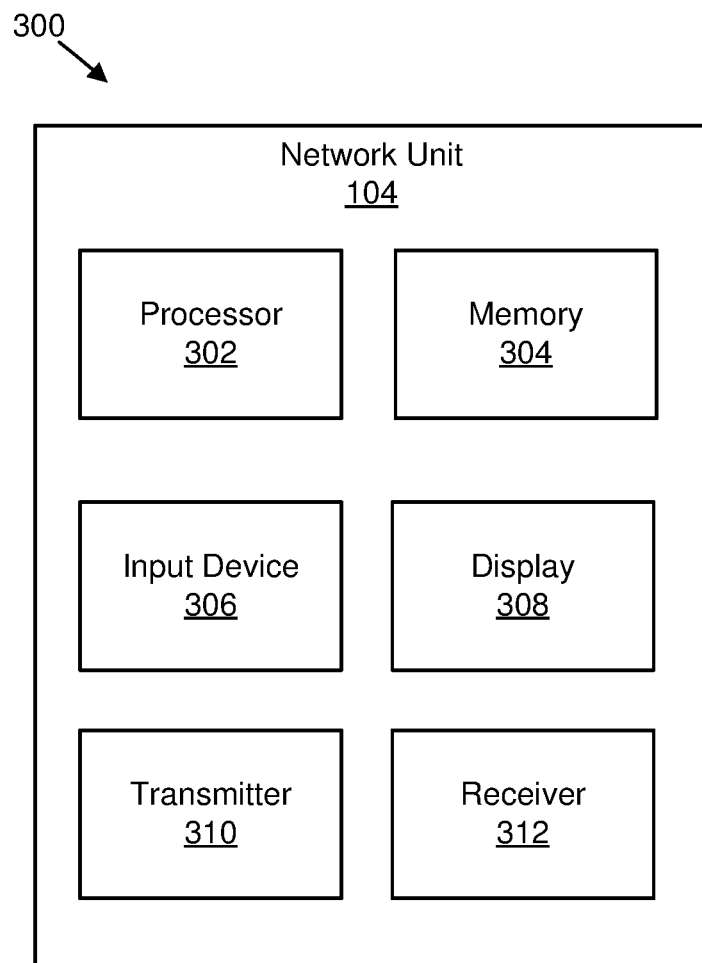
FIG. 3 is a schematic block diagram illustrating one embodiment of an apparatus that may be used for transport block reception.

FIG. 3 depicts one embodiment of an apparatus 300 that may be used for transport block reception. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the processor 302 may: determine validity information for a protocol data unit session for background data transfer; and initiate release of the protocol data unit session in response to a condition of the validity information not being satisfied. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In various embodiments, BD may be transferred within certain conditions. Such conditions may be a time window and/or a location of a terminal (e.g., UE).

In some embodiments, a PCF may provide URSP rules for BDT. In such embodiments, the URSP rules may include validity conditions (e.g., based on a location and/or based on a time window that enables a UE to determine if a PDU session for BDT may be established).

In certain embodiments, it may not be clear once a UE has established a PDU session for BDT how the PDU session is used within a specified location or a specified time window according to validity conditions described within a URSP rule.

In various embodiments, it may be unknown how a network (e.g., mobile communication network) may monitor and/or enforce validity conditions for a data connection (e.g., the data connection may be a PDU session established for BDT).

In some embodiments, a UE uses URSP rules to determine how to route application traffic within a network. In such embodiments, the URSP rules may contain traffic descriptors that enable the UE to match application traffic. Moreover, in such embodiments, once application traffic is matched, the URSP rule may contain route selection descriptors that enable the UE to determine how to route matched application traffic within a PDU session in a core network. Further, in sch embodiments, the route selection descriptors may contain parameters such as S-NSSAI, DNN, and so forth that the UE uses to establish or reuse a relevant PDU session.

In certain embodiments, URSP rules may include validity conditions for a location and/or a time window. In such embodiments, a UE may establish a PDU session only if a corresponding URSP rule is valid. Various embodiments of URSP rules are shown in Table 1.

TABLE 1

URSP Rule Traffic Descriptors

| Information name | Description | Category | PCF permitted to modify in a UE context | Scope |
|---|---|---|---|---|
| Rule Precedence | Determines the order the URSP rule is enforced in the UE. | Mandatory (NOTE 1) | Yes | UE context |
| Traffic descriptor | This part defines the Traffic descriptor components for the URSP rule. | Mandatory (NOTE 3) | | |
| Application descriptors | It consists of OSId and OSAppId(s). (NOTE 2) | Optional | Yes | UE context |
| IP descriptors (NOTE 5) | Destination IP 3 tuple(s) (IP address or IPv6 network prefix, port number, protocol ID of the protocol above IP). | Optional | Yes | UE context |
| Domain descriptors | Destination FQDN(s) | Optional | Yes | UE context |
| Non-IP descriptors (NOTE 5) | Descriptor(s) for destination information of non-IP traffic | Optional | Yes | UE context |
| DNN | This is matched against the DNN information provided by the application. | Optional | Yes | UE context |
| Connection Capabilities | This is matched against the information provided by a UE application when it requests a network connection with certain capabilities. (NOTE 4) | Optional | Yes | UE context |
| List of Route Selection Descriptors | A list of Route Selection Descriptors. | Mandatory | | |

NOTE 1:
Rules in a URSP shall have different precedence values.
NOTE 2:
The information is used to identify the Application(s) that is(are) running on the UE's OS. The OSId does not include an OS version number. The OSAppId does not include a version number for the application.
NOTE 3:
At least one of the Traffic descriptor components shall be present.
NOTE 4:
The format and some values of Connection Capabilities, e.g. "ims", "mms", "internet", etc., may be defined. More than one connection capabilities value can be provided.
NOTE 5:
A URSP rule cannot contain the combination of the Traffic descriptor components IP descriptors and Non-IP descriptors.

TABLE 2

URSP Rule Route Selection Descriptor With Validity Conditions for BDT Traffic

| Information name | Description | Category | PCF permitted to modify in URSP | Scope |
|---|---|---|---|---|
| Route Selection Descriptor Precedence | Determines the order in which the Route Selection Descriptors are to be applied. | Mandatory (NOTE 1) | Yes | UE context |
| Route selection components | This part defines the route selection components | Mandatory (NOTE 2) | | |
| SSC Mode Selection | One single value of SSC mode. (NOTE 5) | Optional | Yes | UE context |
| Network Slice Selection | Either a single value or a list of values of S-NSSAI(s). | Optional (NOTE 3) | Yes | UE context |
| DNN Selection | Either a single value or a list of values of DNN(s). | Optional | Yes | UE context |
| PDU Session Type Selection | One single value of PDU Session Type | Optional | Yes | UE context |
| Non-Seamless Offload indication | Indicates if the traffic of the matching application is to be offloaded to non-3GPP access outside of a PDU Session. | Optional (NOTE 4) | Yes | UE context |

TABLE 2-continued

URSP Rule Route Selection Descriptor With Validity Conditions for BDT Traffic

| Information name | Description | Category | PCF permitted to modify in URSP | Scope |
| --- | --- | --- | --- | --- |
| Access Type preference | Indicates the preferred Access Type (3GPP or non-3GPP or Multi-Access) when the UE establishes a PDU Session for the matching application. | Optional | Yes | UE context |
| Route Selection Validation Criteria (NOTE 6) | This part defines the Route Validation Criteria components | Optional | | |
| Time Window | The time window when the matching traffic is allowed. The RSD is not considered to be valid if the current time is not in the time window. | Optional | Yes | UE context |
| Location Criteria | The UE location where the matching traffic is allowed. The RSD rule is not considered to be valid if the UE location does not match the location criteria. | Optional | Yes | UE context |

NOTE 1:
Every Route Selection Descriptor in the list shall have a different precedence value.
NOTE 2:
At least one of the route selection components shall be present.
NOTE 3:
When the Subscription Information contains only one S-NSSAI in UDR, the PCF needs not provision the UE with S-NSSAI in the Network Slice Selection information. The "match all" URSP rule has one S-NSSAI at most.
NOTE 4:
If this indication is present in a Route Selection Descriptor, no other components shall be included in the Route Selection Descriptor.
NOTE 5:
The SSC Mode 3 shall only be used when the PDU Session Type is IP.
NOTE 6:
The Route Selection Descriptor is not considered valid unless all the provided Validation Criteria are met.
NOTE 7:
Validation Criteria in Roaming scenarios may not be considered.

Figure 4:
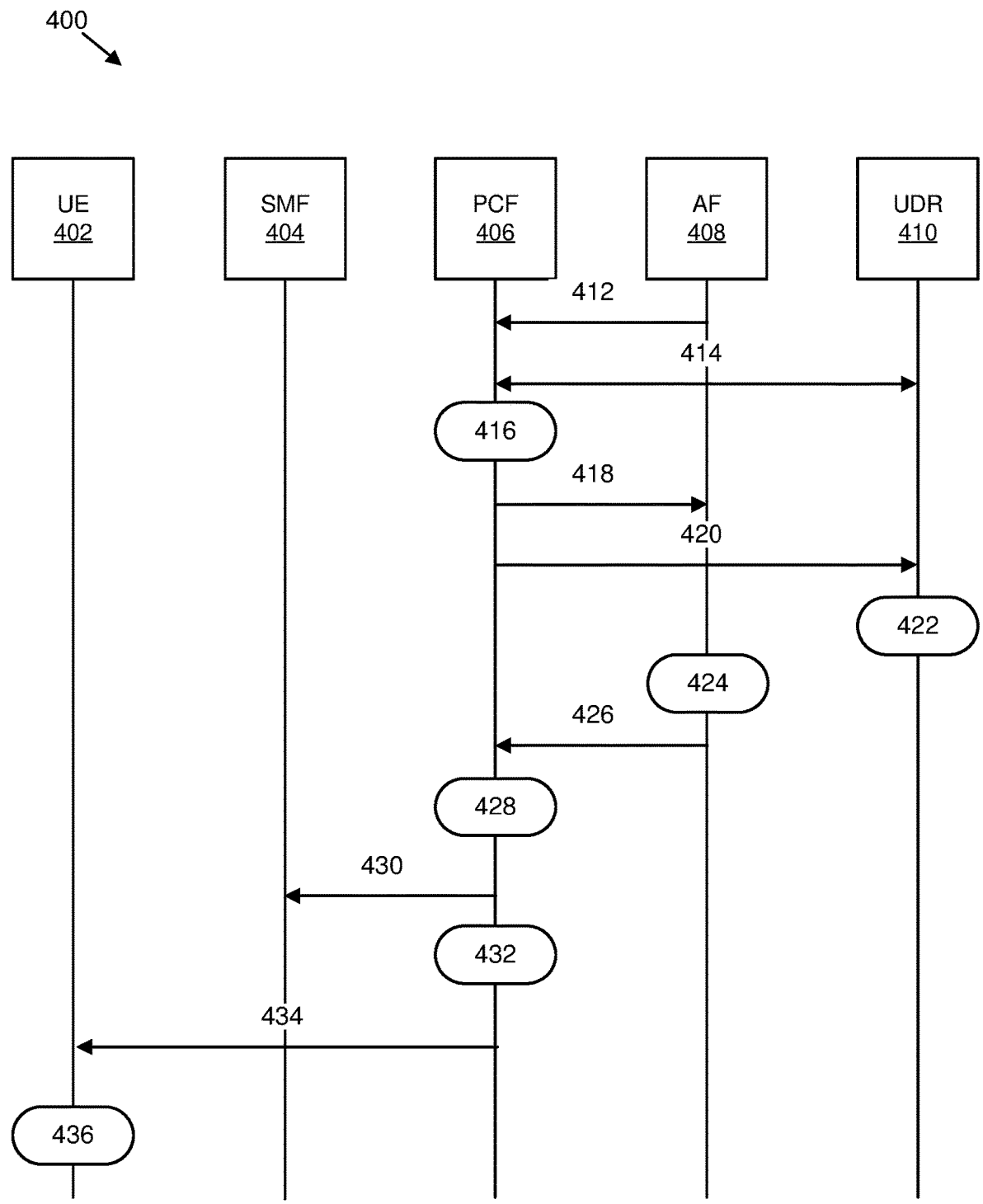
FIG. 4 is a diagram illustrating one embodiment of communications for a policy control function to derive policy and charging control rules and universal software radio peripheral rules for background data transfer.

One embodiment of a procedure to transfer a background data transfer policy is shown in FIG. 4.

FIG. 4 is a diagram illustrating one embodiment of communications 400 for a policy control function to derive policy and charging control rules and universal software radio peripheral rules for background data transfer. The communications 400 include communications between a UE 402, an SMF 404, a PCF 406, an AF 408, and a UDR 410. As may be appreciated, each of the communications 400 described herein may include one or more messages.

In a first communication 412 transmitted from an AF 408 to a PCF 406, the AF 408 (e.g., ASP) requests that the PCF 406 create a policy for background data transfer. The first communication 412 may include Npcf_BDTPolicyControl Create (e.g., ASP identifier, volume of data to transfer, UE group identifier, time window, network area information).

In a second communication 414 transmitted between the PCF 406 and the UDR 410, the PCF 406 queries the UDR 410 to obtain a list of background data transfer policies. The second communication 414 may include Nudr_DM_Query_request (e.g., retrieve all background data transfer policies for the ASP).

The PCF 406 may select 416 a BDT policy and create a BDT reference ID that is used as a reference for the BDT policy. A BDT policy may include a recommended time window for the BDT, a reference to a charging rate for this time window, and optionally a maximum aggregated bitrate (e.g., indicating that the charging according to the referenced charging rate is only applicable for the aggregated traffic of all involved UEs that stay below this value).

In a third communication 418 transmitted from the PCF 406 to the AF 408, the PCF 406 informs the AF 408 (e.g., ASPs AF) about the selected BDT policy including the reference ID. The third communication 418 may include Npcf_BDTPolicyControl_Response (e.g., selected BDT policy plus BDT reference ID).

In a fourth communication 420 transmitted from the PCF 406 to the UDR 410, the PCF 406 informs the UDR 410 of the selected BDT policy along with the reference ID. The fourth communication 420 may include Nud_DM_Update (e.g., selected BDT policy plus BDT reference ID).

The UDR 410 stores 422 the BDT policy along with the BDT reference ID.

If the AF 408 requests to initiate a background data transfer (e.g., is triggered to start a background data transfer), the AF 408 notifies 424 the PCF 406.

In a fifth communication 426 transmitted from the AF 408 to the PCF 406, the AF 408 requests to initiate a BDT and includes in the request to the PCF 406 application session information and the reference ID. The fifth communication 426 may include Npcf service operation (e.g., BDT trigger, AF session information, BDT reference ID).

The PCF 406 retrieves 428 the BDT policy and derives PCC rules (e.g., for BDT traffic for the AF session) that are to be sent to the SMF 404. The PCC rules include AF session information and QoS information (e.g., aggregate bit rate).

In a sixth communication 430 transmitted from the PCF 406 to the SMF 404, the PCF 406 sends the PCC rules to the SMF 404.

The PCF 406 also creates 432 URSP rules for the BDT policy (e.g., adds validity conditions on time window and/or location).

In a seventh communication 434 transmitted from the PCF 406 to the UE 402, the PCF 406 provides the URSP rules to the UE 402 using a UE configuration update for transparent policy delivery.

The UE 402 establishes 436 a PDU session if the URSP rule for BDT traffic is valid.

Various embodiments may be used to apply validity conditions for a data connections. In some embodiments, the data connection may be a PDU session for BDT.

In some embodiments, a PCF creates validity conditions (e.g., or validity rules) for a specific data connection (e.g., PDU session for BDT). The validity conditions may include: 1) an allowed (e.g., enabled) time interval (e.g., allowed time window); 2) an allowed (e.g., enabled) UE location; and/or 3) a volume of data to be transferred per DNN, UE, and so forth.

In various embodiments, a PCF sends validity conditions to an SMF. The validity conditions may be activated (e.g., or applied) once sent and processed in the SMF.

In certain embodiments, an SMF uses validity conditions to perform one or more of the following: 1) configure internal processing (e.g., timers for allowed time window); 2) configure other network functions (e.g., AMF, or RAN node) to report particular information (e.g., SMF subscribes to the AMF to be notified if the UE moves out of an area of interest derived from validity location information); and/or 3) configure the UE with validity conditions of the active PDU session. The SMF may use N1 SM signaling to configure the UE.

In some embodiments, a UE stores and processes validity conditions of an active PDU session. Upon expiring of the validity conditions, the UE may trigger: 1) actions indicated and/or required from the SMF; and/or 2) actions locally configured in the UE. For example, the UE may omit requesting a data connection (e.g., activating UP resources for a PDU Session) if the validity conditions are not fulfilled.

In various embodiments, if a PCF receives a request from an AF to create PCC rules for restricting certain application traffic (e.g., background data transfer traffic), the PCF creates and sends PDU session related policy information to an SMF that the PCF may provide the PDU session related policy information to the SMF together with the PCC rules. In certain embodiments, a PDU session related policy information includes PDU session restriction policies. In such embodiments, the PDU session restriction policies may include a validity area (e.g., based on a UE location) and a time window within which the PDU session should be active. In some embodiments, PDU session restriction policies may be derived from a BDT policy provided and/or negotiated between a PCF and an AF. In such embodiments, if a UE moves outside of a validity area or is outside a time window an SMF releases the PDU session.

Figure 5:
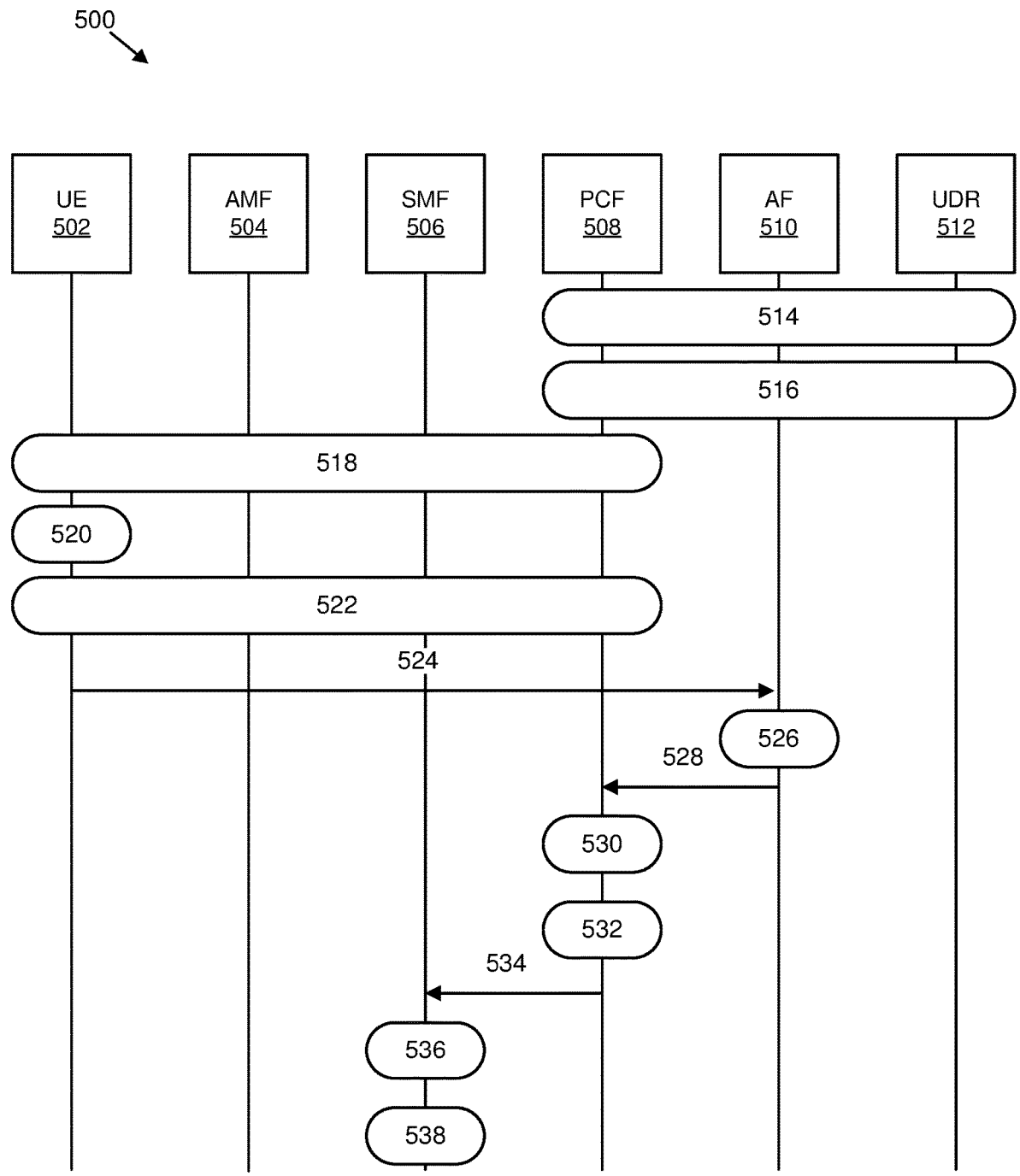
FIG. 5 is a diagram illustrating one embodiment of communications for a procedure for data connection validity conditions creation in a policy control function and activation in a session management function.

FIG. 5 is a diagram illustrating one embodiment of communications 500 for a procedure for data connection validity conditions creation in a policy control function and activation in a session management function. The communications 500 include communications between a UE 502, an AMF 504, an SMF 506, a PCF 508, an AF 510, and a UDR 512. As may be appreciated, each of the communications 500 described herein may include one or more messages.

In a first communication 514 transmitted between the PCF 508, the AF 510, and the UDR 512, negotiation of BDT policy between the AF 510, the PCF 508, and the UDR 512 occurs.

In a second communication 516 transmitted between the PCF 508, the AF 510, and the UDR 512, configuration of URSP rules between the PCF 508 and the AF 510 occur.

In a third communication 518 transmitted between the UE 502, the AMF 504, the SMF 506, and the PCF 508, provisioning of URSP rules occurs using UE configuration update.

The UE 502 starts 520 a PDU session for BDT if the validity condition in the USRP rule is met.

In a fourth communication 522 transmitted between the UE 502, the AMF 504, the SMF 506, and the PCF 508, a PDU session establishment procedure is performed.

In a fifth communication 524 transmitted from the UE 502 to the AF 510, the UE 502 transmits BDT application traffic to the AF 510.

If the PDU session is established, the AF 510 is triggered 526 to start BDT.

In a sixth communication 528 transmitted from the AF 510 to the PCF 508, the AF 510 notifies the PCF 508 of the BDT. The sixth communication 528 ma include Npcf service operation (e.g., BDT trigger, AF session information, BDT reference ID).

The PCF 508 retrieves 530 the application restriction policy (e.g., BDT policy) from the UDR 512 using a reference ID and identifies a PDU session that carries application traffic based on AF session information and/or a DNN.

The PCF 508 derives 532 (e.g., creates) a PDU session restriction policy (e.g., BDT validity policy) within the PDU session related policy information for the application traffic (e.g., application conveying BDT traffic, BDT transfer) (as shown in Table 3) based the application restriction policy retrieved from the UDR 512 (e.g., a BDT policy). The AF 510 may provide other restriction policies for other application traffic.

In a seventh communication 534 transmitted from the PCF 508 to the SMF 506, the PCF 508 transmits an SM policy association update (e.g., PDU session related information for BDT transfer) to the SMF 506.

If the BDT policy has a time window, the SMF 506 ensures 536 the PDU session is active within the time window of the validity condition. For example, if the SMF 506 receives PDU session related policy information that includes a PDU session restriction policy with an allowed time window, the SMF 506 ensures that the PDU session is active within the allowed time window. The SMF 506 may start a timer (e.g., based on the allowed time window) and release the PDU session at a time in which the timer expires.

If the BDT policy has valid location information, the SMF 506 subscribes 538 from the AMF 504 to be notified if the UE leaves valid areas and deletes the PDU session. For example, if the SMF 506 receives PDU session related policy information that includes a PDU session restriction policy with an allowed location, the SMF 506 subscribes from the AMF 504 to be notified if the UE 502 leaves areas of Interest. In one embodiment, the SMF 506 subscribes to a "UE Mobility Event notification" service provided by the AMF 504. If the AMF 504 notifies the SMF 506 that the UE 502 has left an area of interest, the SW 506 may release the PDU session that has such PDU session restriction policies.

TABLE 3

Addition of PDU Session Restriction Policy Within PDU Session Related Policy Information

| | Description | PCF permitted to modify for dynamically provided information | Scope | Differences compared with other tables |
|---|---|---|---|---|
| Attribute | | | | |
| Charging information | Defines the containing CHF address. | No | PDU Session | None |
| Default charging method | Defines the default charging method for the PDU Session. | No | PDU Session | None |
| Policy control request trigger | Defines the event(s) that shall cause a re-request of PCC rules for the PDU Session. | Yes | PDU Session | Explicitly subscribed by invoking Npcf_SMPolicyControl service operation |
| Authorized QoS per bearer (UE-initiated IP-CAN bearer activation/modification) | Defines the authorised QoS for the IP-CAN bearer (QCI, GBR, MBR). | Yes | IP-CAN bearer | Removed |
| Authorized MBR per QCI (network initiated IP-CAN bearer activation/modification) | Defines the authorised MBR per QCI. | Yes | IP-CAN session | Removed |
| Revalidation time limit | Defines the time period within which the SMF shall perform a PCC rules request. | Yes | PDU Session | None |
| PRA Identifier(s) | Defines the Presence Reporting Area(s) to monitor for the UE with respect to entering/leaving | Yes | PDU Session | None but only applicable to PCF |
| List(s) of Presence Reporting Area elements (NOTE 14) | Defines the elements of the Presence Reporting Area(s) | Yes | PDU Session | None but only applicable to PCF |
| Default NBIFOM access | The access to be used for all traffic that does not match any existing Routing Rule | Yes (only at the addition of an access to the IP-CAN session) | IP-CAN session | Removed |
| IP Index (NOTE 11) | Provided to SMF to assist in determining the IP Address allocation method (e.g. which IP pool to assign from) when a PDU Session requires an IP address. | No | PDU Session | Added |
| Explicitly signalled QoS Characteristics (NOTE 1) | Defines a dynamically assigned 5QI value (from the non-standardized value range) and the associated 5G QoS characteristics. | No | PDU Session | Added |
| Reflective QoS Timer | Defines the lifetime of a UE derived QoS rule belonging to the PDU Session. | No | PDU Session | Added |
| Authorized Session-AMBR (NOTE 2) (NOTE 3) | Defines the Aggregate Maximum Bit Rate for the Non-GBR QoS Flows of the PDU Session. | Yes | PDU Session | Modified |
| Authorized default 5QI/ARP (NOTE 3) (NOTE 10) | Defines the default 5QI and ARP of the QoS Flow associated with the default QoS rule. | Yes | PDU Session | Modified |
| Time Condition (NOTE 4) | Defines the time at which the corresponding Subsequent Authorized Session-AMBR or Subsequent Authorized default 5QI/ARP shall be applied. | No (NOTE 5) | PDU Session | Modified |
| Subsequent Authorized Session-AMBR (NOTE 4) (NOTE 2) | Defines the Aggregate Maximum Bit Rate for the Non-GBR QoS Flows of the PDU Session when the Time Condition is reached. | No (NOTE 5) | PDU Session | Modified |

TABLE 3-continued

Addition of PDU Session Restriction Policy Within PDU Session Related Policy Information

| | Description | PCF permitted to modify for dynamically provided information | Scope | Differences compared with other tables |
|---|---|---|---|---|
| Subsequent Authorized default 5QI/ARP (NOTE 4) (NOTE 10) | Defines the default 5QI and ARP when the Time Condition is reached. | No (NOTE 5) | PDU Session | Modified |
| Usage Monitoring Control related information NOTE 13) | Defines the information that is required to enable user plane monitoring of resources for individual applications/services, groups of applications/services, for a PDU Session. | | | |
| Monitoring key | The PCF uses the monitoring key to group services that share a common allowed usage. | No | PDU Session (NOTE 12) | None |
| Volume threshold (NOTE 7) | Defines the traffic volume value after which the SMF shall report usage to the PCF for this monitoring key. | Yes | Monitoring key | None |
| Time threshold (NOTE 7) | Defines the resource time usage after which the SMF shall report usage to the PCF. | Yes | Monitoring key | None |
| Monitoring time | Defines the time at which the SMF shall reapply the Volume and/or Time Threshold. | No (NOTE 6) | Monitoring Key | None |
| Subsequent Volume threshold (NOTE 9) | Defines the traffic volume value after which the SMF shall report usage to the PCF for this Monitoring key for the period after the Monitoring time. | No (NOTE 6) | Monitoring Key | None |
| Subsequent Time threshold (NOTE 9) | Defines resource time usage after which the SMF shall report usage to the PCF for this Monitoring key for the period after the Monitoring time. | No (NOTE 6) | Monitoring Key | None |
| Inactivity Detection Time (NOTE 8) | Defines the period of time after which the time measurement shall stop, if no packets are received. | Yes | Monitoring Key | None |
| MA PDU Session Control | | | | |
| Usage Monitoring Information for the non-3GPP access (NOTE 13) | Indicates parameters used fo monitor usage of packets carried via non-3GPP access for a MA PDU Session. The same set of parameters as for the Usage Monitoring Control information above applies. If a parameter is not included here, the value provided in the Usage Monitoring information above applies. | Yes | As indicated in "Usage Monitoring Control Information" | New |
| PDU session restriction policy | | | | |
| Allowed Time Window | Defines the time window that the PDU session should be active. The SMF shall release the PDU session if active outside the time window | Yes | PDU session | New |
| List of Allowed Locations | Defines the location (e.g. TA, Cell IDs) that the PDU session is allowed to be active. The SMF may release the PDU session if the UE is outside the allowed location(s). | Yes | PDU Session | New |

NOTE 1:
Multiple Non-standardized QoS Characteristics can be provided by the PCF. Operator configuration is assumed to ensure that the non-standardized 5QI to QoS characteristic relation is unique within the PLMN.
NOTE 2:
The Authorized Session-AMBR and the Subsequent Authorized Session-AMBR may be provided together with a list of Access Types possibly complemented by RAT types.

TABLE 3-continued

Addition of PDU Session Restriction Policy Within PDU Session Related Policy Information

| Description | PCF permitted to modify for dynamically provided information | Scope | Differences compared with other tables |
| --- | --- | --- | --- |

NOTE 3:
There is always an unconditional value for the Authorized Session-AMBR and Authorized default 5QI/ARP available at the SMF. The initial value is received as Subscribed Session-AMBR/Subscribed default 5QI/ARP, and the PCF can overwrite it with these parameters.
NOTE 4:
The Time Condition and Subsequent Authorized Session-AMBR/Subsequent Authorized default 5QI/ARP are used together. The PCF may provide up to four instances of them. When multiple instances are provided, the values of the associated Time Condition have to be different.
NOTE 5:
The PCF may replace all instances that have been provided previously with a new instruction. A previously provided Time Condition and Subsequent Authorized Session-AMBR/Subsequent Authorized default 5QI/ARP pair cannot be individually modified.
NOTE 6:
The PCF may replace all instances that have been provided previously with a new instruction. A previously provided Volume threshold/Time threshold and Monitoring Time pair cannot be individually modified.
NOTE 7:
This attribute is also used by the SMF, e.g. during PDU Session termination, to inform the PCF about the resources that have been consumed by the UE.
NOTE 8:
This attribute is applicable in presence of Time threshold only.
NOTE 9:
This attribute is applicable in presence of Monitoring Time only.
NOTE 10:
The Authorized default 5QI and the Subsequent Authorized default 5QI shall be of Non-GBR Resource Type.
NOTE 11:
This attribute is applicable only when no IP address/Prefix for the PDU session is received from the SMF.
NOTE 12:
A Monitoring Key can either be used to monitor the traffic of a PDU session or specific SDF(s) in the PCC Rule(s) that share the same Monitoring Key.
NOTE 13:
For a MA PDU Session, the parameters in the Usage Monitoring Control Section applies to both accesses if there is no corresponding Usage Monitoring Control parameter in the MA PDU Session Control Section. If there is a Usage Monitoring Control parameter provided in MA PDU Session Control Section, it applies to non-3GPP access and the corresponding parameter in the Usage Monitoring Control Section applies to 3GPP access.
NOTE 14:
The list of PRA elements shall be a short list of elements.

Figure 6:
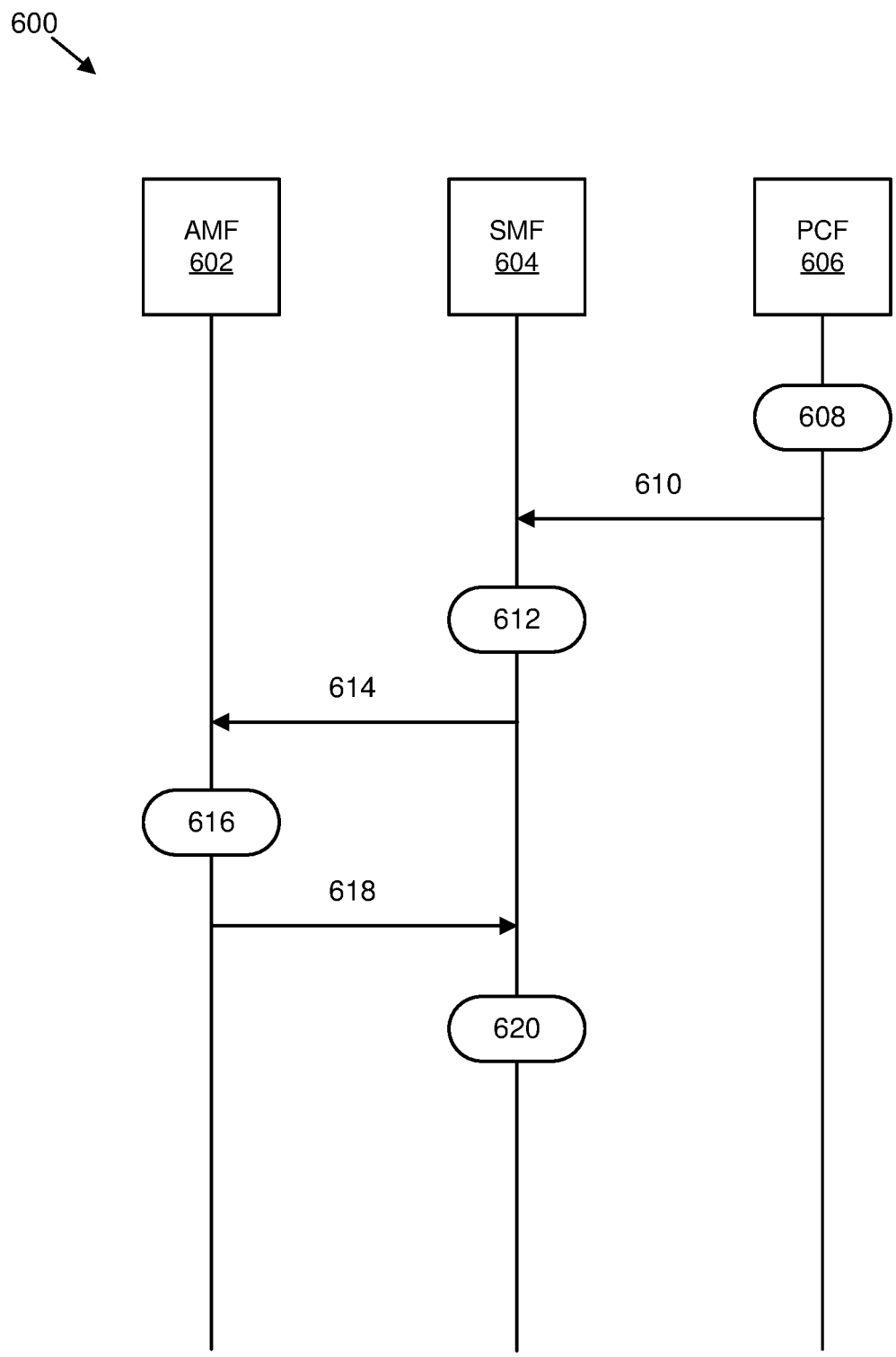
FIG. 6 is a diagram illustrating one embodiment of communications for a session management function subscribing from an access and mobility management function to be notified if a user equipment moves out of an area of interest.

FIG. 6 is a diagram illustrating one embodiment of communications 600 for a session management function subscribing from an access and mobility management function to be notified if a user equipment moves out of an area of interest. The communications 600 include communications between an AMF 602, an SMF 604, and a PCF 606. As may be appreciated, each of the communications 600 described herein may include one or more messages.

The PCF 606 may receive 608 a trigger (e.g., from an AF) to update PCC rules for a PDU session (e.g., for a PDU session used for BDT traffic).

In a first communication 610 transmitted from the PCF 606 to the SMF 604, the PCF 606 may transmit an SM policy association update (e.g., PDU session restriction policy).

The SMF 604 may identify 612 areas of interest and subscribe from the AMF 602 to be notified if a UE moves out of the areas of interest.

In a second communication 614 transmitted from the SMF 604 to the AMF 602, the SMF 604 may transmit Namf_Event_Exposure_Subscribe (e.g., SUPI, event ID, areas of interest) to the AMF 602.

The AMF 602 may identify 616 if a UE leaves areas of interest.

In a third communication 618 transmitted from the AMF 602 to the SMF 604, the AMF 602 may transmit Namf_Event_Exposure_Notify (e.g., SUPI, out of areas of interest) to the SMF 604.

In one embodiment, instead of the SMF 604 releasing the PDU session, if the SMF 604 is informed from the AMF 602 that the has left an area of interest, the SMF 604 may decide 620 to deactivate a user plane traffic of the PDU session that has a PDU session restriction policy. The SMF 604 may wait for an implementation dependent timer to decide if the PDU session should be released or reactivated. If the SMF 604 is informed that the UE has entered a valid area of interest, the SMF 604 may re-activate the PDU session. If the implementation dependent timer expires, the SMF 604 may decide to release the deactivated PDU session.

Figure 7:
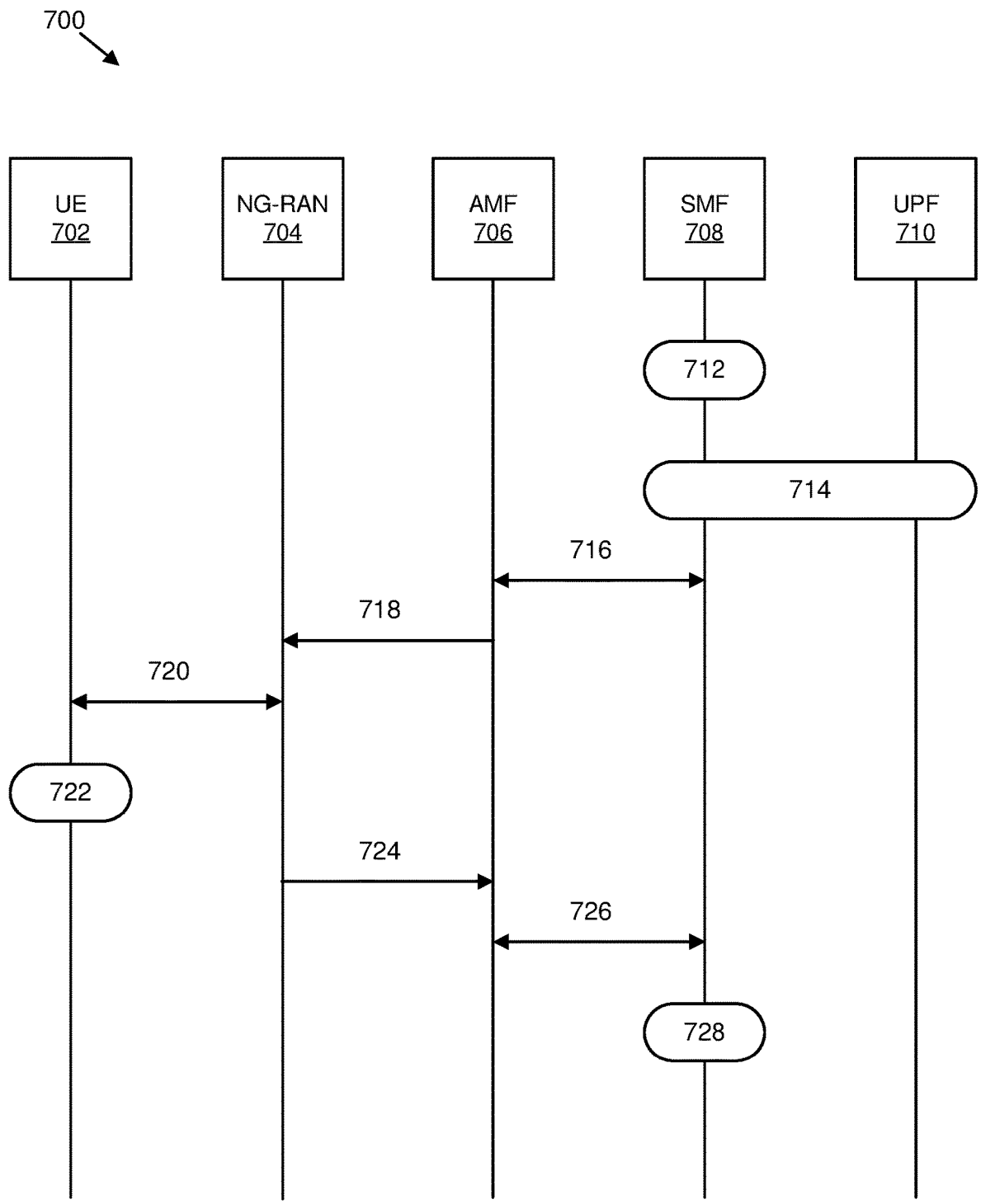
FIG. 7 is a diagram illustrating one embodiment of communications for a session management function deactivating a packet data unit session for background data transfer traffic if a user equipment leaves an area of interest.

FIG. 7 is a diagram illustrating one embodiment of communications 700 for a session management function deactivating a packet data unit session for background data transfer traffic if a user equipment leaves an area of interest. The communications 700 include communications between a UE 702, an NG-RAN 704, an AMF 706, an SMF 708, and a UPF 710. As may be appreciated, each of the communications 700 described herein may include one or more messages.

In one embodiment, if the SMF 708 determines 712 that the UE 702 has either: 1) left an area of interest; or 2) an allowed time window has expired, the SMF 708 decides to deactivate a UP connection of a PDU session that has PDU session restriction policies (e.g., PDU session used for BDT traffic).

In a first communication 714 transmitted between the SMF 708 and the UPF 710, the SMF 708 may indicate to the UPF 710 to deactivate UP resources (e.g., upon data transmission inactivity, release N3 connection). In the first communication 714, the UP resources of the PDU session may not be immediately deactivated if data is currently ongoing. This may be helpful to facilitate good user and/or application experience. Once data inactivity is detected in the UPF 710 (e.g., based on a data inactivity timer), the UPF 710 may initiate deactivation of the UP resources.

In a second communication 716 transmitted between the AMF 706 and the SMF 708, the AMF 706 and the SMF 708 may include a Namf_Communication_N1N2MessageTransfer message. In a third communication 718 transmitted from the AMF 706 to the NG-RAN 704, the AMF 706 may transmit an N2 PDU session resource release command message to the NG-RAN 704. In a fourth communication 720 transmitted between the UE 702 and the NG-RAN 704, a RAN-specific resource release message may be communicated. In the second communication 716, the third communication 718, and/or the fourth communication 720, the SMF 708 may include a release and/or deactivation cause value in an N2 SM information message sent from the SMF 708 to the NG-RAN 704. The release and/or deactivation cause may indicate a reason for deactivation (e.g., due to expired validity conditions for a PDU session, due to an expired allowed time window, or due to the UE 702 moving out of allowed areas for the PDU session). Moreover, the NG-RAN 704 may transfer this indication to the UE 702.

If the UE 702 detects 722 that the UP resources for a PDU session are deactivated and/or based on the release and/or deactivation indication, the UE 702 may re-evaluate URSP rules. The UE 702 may decide on its own whether to keep the PDU session or release it based on validity conditions of the URSP rules that have validity conditions (e.g., URSP rule that triggered the UE 702 to establish a PDU session for BDT traffic).

In a fifth communication 724 transmitted from the NG-RAN 704 to the AMF 706, the NG-RAN 704 may transmit a N2 PDU session resource release response message to the AMF 706.

In a sixth communication 726 transmitted between the AMF 706 and the SMF 708, an Nsmf_PDUSession_UpdateSMContext message may be communicated.

If a timer expires and the UE 704 has not re-entered areas of interest, the SMF 708 may release 728 the PDU session for BDT transfer. If the UE 704 re-enters areas of interest and the SMF 708 decides to re-activate UP resources for the PDU session, the SMF 708 may remove the timer.

In certain embodiments, a DNN used for a PDU session used for transferring specific application traffic (e.g., BDT traffic) may be configured as an LADN DNN. In such embodiments, a UE may be informed from an AMF about whether the UE enters a specific area of interest that supports the DNN. Moreover, in such embodiments, if the UE is informed that the UE has entered an area of interest, the UE checks URSP rules and determines whether a PDU session should be established based on validity conditions of URSP rules (e.g., time window or valid location). If the UE determines that URSP rules are not valid, the UE may not establish a PDU session even if the UE enters an area of interest that supports a local DNN.

In some embodiments, a PCF may subscribe from an SMF to be notified if a UE enters or leaves an area of interest (e.g., based on a BDT policy configured by an AF). In such embodiments, if the PCF is notified that the UE leaves an area of interest, the PCF may provide updated URSP rules to the UE (e.g., using a UE configuration update for transparent policy delivery message) if a relevant URSP rule that includes validity conditions is deleted.

In various embodiments, during a PDU session establishment procedure or PDU session modification procedure, an SMF may send PDU session validity conditions to a UE. For example, the SMF may include an indication or IE in an N1 SM message transmitted to a UE (e.g., a PDU session establishment accept message and/or a PDU session modification command message). The IE may be called PDU session validity conditions and/or may include one or more parameters (e.g., allowed and/or valid location, allowed and/or valid time window, allowed and/or valid data volume, and so forth). In some embodiments, an SMF may send an indication about required and/or desired actions upon expiration of validity conditions. For example, the actions may include: a) stopping sending data, but keep a PDU session established; b) stopping sending data after expiration of a guard activity timer; and/or c) initiating a PDU session release procedure.

In certain embodiments, a UE may store an IE with validity conditions received from an SMF. In such embodiments, if the UE sends MO data for a PDU Session, the UE may take measures to send the MO data before the validity conditions expire. The UE may locally perform one of the following actions: a) start a local timer (e.g., based on an allowed time window); b) indicate to an access stratum layer to be informed upon entering a non-allowed area (e.g., area outside of the allowed and/or valid location)—an area granularity such as a TA or cell ID may be according to the allowed and/or valid location received in an N1 SM message from the SMF; and/or c) start a local data counter based on an allowed data volume.

In some embodiments, upon expiration of one or more PDU session validity conditions, a UE may initiate specific actions based on an indication from an SMF or based on an internal UE configuration. For example, one of the following may be performed: a) if UP resources of a PDU session are deactivated (e.g., the PDU session is deactivated), the UE may omit initiating activation of UP resources of the PDU Session if the validity conditions are not fulfilled—for example, the UE may send an NAS service request message to activate the UP resources for this PDU Session; and/or b) if there is ongoing data transmission, the UE may either: 1) immediately stop sending data; 2) the UE may continue sending data until an upper layer application sends data, or until a pre-defined guard activity time, and afterwards may stop sending data; and/or 3) the UE may initiate a PDU session release.

Figure 8:
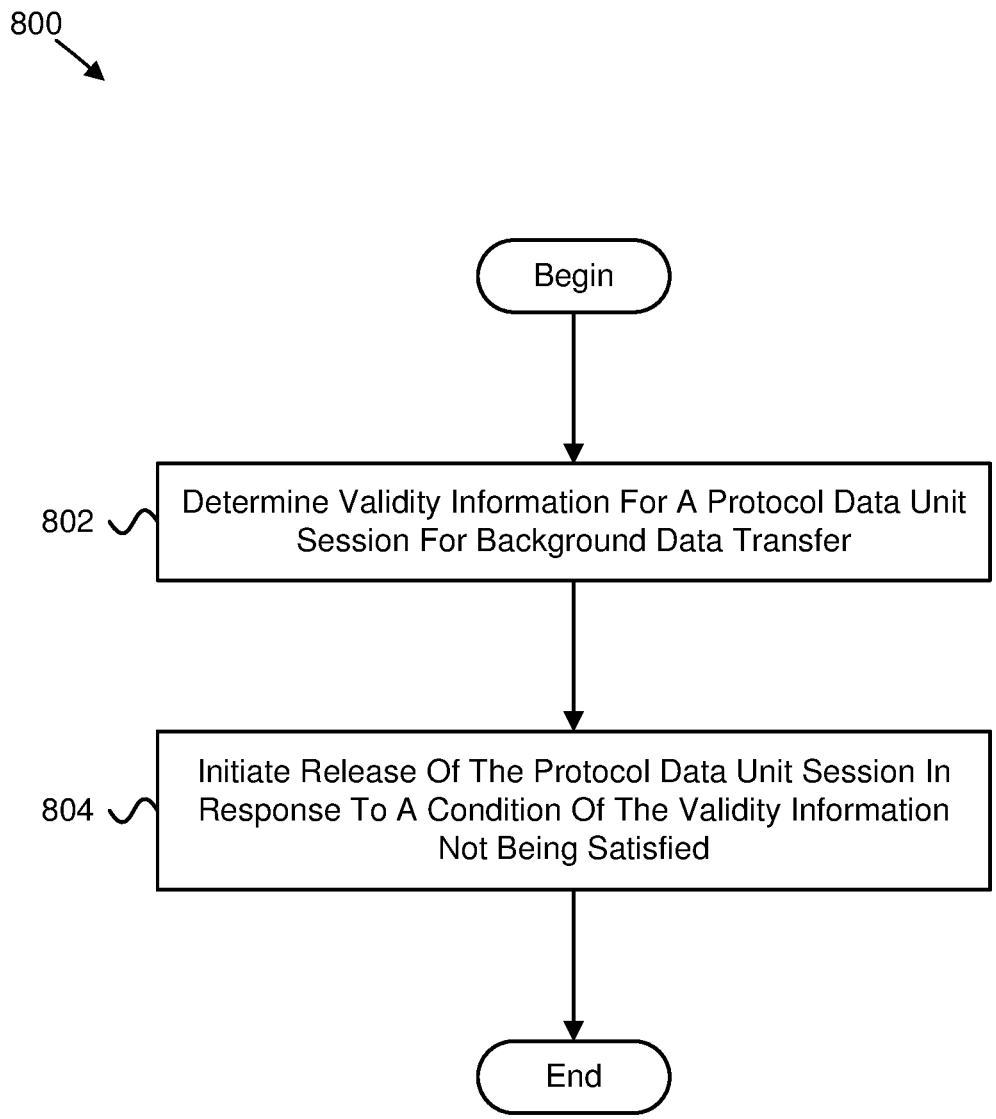
FIG. 8 is a flow chart diagram illustrating one embodiment of a method for validity information conditions.

FIG. 8 is a flow chart diagram illustrating one embodiment of a method 800 for validity information conditions. In some embodiments, the method 800 is performed by an apparatus, such as the network unit 104. In certain embodiments, the method 800 may be performed by a processor executing program code, for example, a microcontroller, a microprocessor, a CPU, a GPU, an auxiliary processing unit, a FPGA, or the like.

In various embodiments, the method 800 includes determining 802 validity information for a protocol data unit session for background data transfer. In some embodiments, the method 800 includes initiating 804 release of the protocol data unit session in response to a condition of the validity information not being satisfied.

In certain embodiments, a policy control function determines the validity information. In some embodiments, the validity information comprises one or more validity conditions, one or more validity rules, or a combination thereof. In various embodiments, the validity information comprises a time interval, a time window, location information, a volume of data, or some combination thereof.

In one embodiment, the method 800 further comprises transmitting the validity information. In certain embodiments, the validity information is transmitted to a session management function. In some embodiments, the validity information is transmitted to the session management function as a policy rule.

In various embodiments, a user equipment is configured with the validity information.

In one embodiment, the release of the protocol data unit session is initiated in response to a user equipment moving outside of a valid area. In certain embodiments, the release of the protocol data unit session is initiated in response to a time window expiring.

In one embodiment, a method comprises: determining validity information for a protocol data unit session for background data transfer; and initiating release of the protocol data unit session in response to a condition of the validity information not being satisfied.

In certain embodiments, a policy control function determines the validity information.

In some embodiments, the validity information comprises one or more validity conditions, one or more validity rules, or a combination thereof.

In various embodiments, the validity information comprises a time interval, a time window, location information, a volume of data, or some combination thereof.

In one embodiment, the method further comprises transmitting the validity information.

In certain embodiments, the validity information is transmitted to a session management function.

In some embodiments, the validity information is transmitted to the session management function as a policy rule.

In various embodiments, a user equipment is configured with the validity information.

In one embodiment, the release of the protocol data unit session is initiated in response to a user equipment moving outside of a valid area.

In certain embodiments, the release of the protocol data unit session is initiated in response to a time window expiring.

In one embodiment, an apparatus comprises: a processor that: determines validity information for a protocol data unit session for background data transfer; and initiates release of the protocol data unit session in response to a condition of the validity information not being satisfied.

In certain embodiments, a policy control function determines the validity information.

In some embodiments, the validity information comprises one or more validity conditions, one or more validity rules, or a combination thereof.

In various embodiments, the validity information comprises a time interval, a time window, location information, a volume of data, or some combination thereof.

In one embodiment, the apparatus further comprises a transmitter that transmits the validity information.

In certain embodiments, the validity information is transmitted to a session management function.

In some embodiments, the validity information is transmitted to the session management function as a policy rule.

In various embodiments, a user equipment is configured with the validity information.

In one embodiment, the release of the protocol data unit session is initiated in response to a user equipment moving outside of a valid area.

In certain embodiments, the release of the protocol data unit session is initiated in response to a time window expiring.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a network function serving a user equipment, the method comprising:
    determining, by the network function, validity information for a protocol data unit session for background data transfer, wherein the validity information comprises a time interval, a time window, location information, a volume of data, or some combination thereof, and wherein determining the validity information comprises receiving the validity information to a second network function as a policy rule;
    establishing the protocol data unit session; and
    after establishing the protocol data unit session, initiating, by the network function, release of the protocol data unit session in response to a condition of the validity information not being satisfied.

2. The method of claim 1, further comprising receiving, from a network entity, the validity information, wherein the network entity comprises a policy control function.

3. The method of claim 1, wherein the validity information comprises one or more validity conditions, one or more validity rules, or a combination thereof.

4. The method of claim 1, wherein the second network function comprises a session management function.

5. The method of claim 1, wherein a user equipment is configured with the validity information.

6. The method of claim 1, wherein the release of the protocol data unit session is initiated in response to a user equipment moving outside of a valid area.

7. The method of claim 1, wherein the release of the protocol data unit session is initiated in response to a time window expiring.

8. An apparatus comprising a network function serving a user equipment, the apparatus further comprising:
    a receiver; and
    a processor that:
        determines, by the network function, validity information for a protocol data unit session for background data transfer, wherein the validity information comprises a time interval, a time window, location information, a volume of data, or some combination thereof, and wherein determining the validity information comprises the receiver receiving the validity information to a second network function as a policy rule;
        establishes the protocol data unit session; and
        after establishing the protocol data unit session, initiates, by the network function, release of the protocol data unit session in response to a condition of the validity information not being satisfied.

9. The apparatus of claim 8, further comprising a receiver that receives, from a network entity, the validity information, wherein the network entity comprises a policy control function.

10. The apparatus of claim 8, wherein the validity information comprises one or more validity conditions, one or more validity rules, or a combination thereof.

11. The apparatus of claim 8, wherein the second network function comprises a session management function.

12. The apparatus of claim 8, wherein a user equipment is configured with the validity information.

13. The apparatus of claim 8, wherein the release of the protocol data unit session is initiated in response to a user equipment moving outside of a valid area.

14. The apparatus of claim 8, wherein the release of the protocol data unit session is initiated in response to a time window expiring.

* * * * *